(12) United States Patent
Kim et al.

(10) Patent No.: US 8,144,771 B2
(45) Date of Patent: Mar. 27, 2012

(54) METHOD AND APPARATUS FOR IMAGE CODING AND DECODING WITH CROSS-REFERENCE MODE

(75) Inventors: So-young Kim, Yongin-si (KR); Jeong-hoon Park, Seoul (KR); Sang-rae Lee, Suwon-si (KR); Yu-mi Sohn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1395 days.

(21) Appl. No.: 11/437,648

(22) Filed: May 22, 2006

(65) Prior Publication Data
US 2006/0268984 A1 Nov. 30, 2006

(30) Foreign Application Priority Data
May 21, 2005 (KR) ........................ 10-2005-0042776

(51) Int. Cl.
*H04N 7/12* (2006.01)
(52) U.S. Cl. ................................. 375/240.13
(58) Field of Classification Search ............. 375/240.13
See application file for complete search history.

(56) References Cited

U.S. PATENT DOCUMENTS

| 5,771,081 A | 6/1998 | Lee |
| 5,786,858 A | 7/1998 | Yagasaki et al. |
| 2002/0048321 A1 | 4/2002 | Katayama |
| 2003/0169816 A1 | 9/2003 | Wang et al. |
| 2004/0096109 A1 | 5/2004 | Wang et al. |
| 2004/0233989 A1* | 11/2004 | Kobayashi et al. ...... 375/240.16 |
| 2005/0002582 A1 | 1/2005 | Wang et al. |
| 2005/0008239 A1 | 1/2005 | Wang et al. |
| 2005/0008241 A1 | 1/2005 | Wang et al. |
| 2005/0053158 A1 | 3/2005 | Regunathan et al. |

FOREIGN PATENT DOCUMENTS

| JP | 10-023424 A | 1/1998 |
| KR | 1996-0007264 B1 | 5/1996 |
| KR | 10-0128878 B1 | 11/1997 |
| KR | 10-0238622 B1 | 1/2000 |
| KR | 10-0267125 B1 | 10/2000 |
| KR | 10-0420740 B1 | 3/2004 |

OTHER PUBLICATIONS

Communication dated Oct. 27, 2011 issued by the Korean Intellectual Property Office in counterpart Korean Application No. 10-2005-0042776.

* cited by examiner

*Primary Examiner* — Jay Patel
*Assistant Examiner* — Richard Torrente
(74) *Attorney, Agent, or Firm* — Sughrue Mion, PLLC

(57) ABSTRACT

An image compression method and apparatus, in which coding efficiency is improved by coding multiple pictures through cross-reference between the pictures, and an image decompression method and apparatus. The image compression method includes dividing each of the pictures into predetermined slices, determining a prediction mode having higher efficiency and a coding order for each of corresponding slices of the pictures by performing prediction on the corresponding slices, and coding each of the slices in the determined prediction mode according to the determined order of coding. The pictures are coded through cross-reference between them.

18 Claims, 9 Drawing Sheets

METHOD AND APPARATUS FOR IMAGE CODING AND DECODING WITH CROSS-REFERENCE MODE

CROSS-REFERENCE TO RELATED PATENT APPLICATION

This application claims priority from Korean Patent Application No. 10-2005-0042776, filed on May 21, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to video coding-decoding (CODEC), and more particularly, to image compression and decompression in which coding efficiency is improved by coding a plurality of pictures through cross-reference between the pictures.

2. Description of the Related Art

An image signal generally has high redundancy (also called correlation), i.e., has much information that can be reduced. A signal value of a pixel has a high correlation with that of an adjacent pixel. Orthogonal transformation reduces spatial redundancy and prediction coding reduces temporal redundancy. In particular, prediction coding represents a signal value of a pixel as a differential from a signal value of a pixel in a different time, i.e., a signal value of a past or future pixel. The prediction coding includes intraprediction that does not use a prediction memory and interprediction that uses a prediction memory.

The prediction coding is performed on intra (I) or predicted (P) pictures. An I picture is encoded only using information within itself without referencing any frames and is generated in an intraprediction mode (also called an intra mode). At least one I picture is required for a random access in each group of pictures (GOP). All pixels in the I picture are encoded in the intraprediction mode. A P picture is generated through prediction from an I picture or another P picture. In general, all pixels in the P picture are encoded in the intraprediction mode or an interprediction mode (also called an inter mode). In addition, the prediction coding may also be performed on bidirectional predicted (B) pictures generated by bidirectional prediction.

FIGS. 1A and 1B are reference diagrams for explaining a conventional image compression method.

Referring to FIG. 1A, in the conventional image compression method, an I picture is encoded in an intra mode and only a portion of a P picture, which is different from the encoded I picture, is encoded in an inter mode. More specifically, referring to FIG. 1B, all pixels included in the I picture are encoded in units of a slice in the intra mode, but all pixels included in the P picture are encoded in the inter mode or the intra mode by referring to corresponding slices of the I picture. In other words, in a conventional coding method, intracoding is the only coding type performed on an I picture, and other types of pictures such as P or B pictures are coded by referring to the intracoded I picture. Numbers shown in FIG. 1B indicate the order of coding of corresponding slices, and slices of the P picture are coded after all slices of the I picture are coded.

SUMMARY OF THE INVENTION

The present invention provides an image compression method and apparatus, in which coding efficiency is improved by coding a plurality of pictures through cross-reference between the pictures, and an image decompression method and apparatus.

According to an aspect of the present invention, there is provided an image compression method. The image compression method includes dividing each of a plurality of pictures into predetermined slices, determining a prediction mode having higher efficiency and a coding order for each of corresponding slices of the pictures by performing prediction on the corresponding slices, and coding each of the slices in the determined prediction mode according to the determined order of coding. The plurality of pictures is coded through cross-reference between them.

The size and shape of each of the predetermined slices may vary from a macroblock to a picture.

The determination of the prediction mode and the coding order may include comparing a cost corresponding to prediction of each of the corresponding slices in an intra mode and a cost corresponding to prediction of each of the corresponding slices in an inter mode and determining a mode having the smaller cost as a prediction mode for each of the corresponding slices.

The determination of the prediction mode and the coding order may include determining the coding order based on the determined prediction mode such that, among the corresponding slices of the pictures, a slice corresponding to an intra mode has the higher coding priority than a slice corresponding to an inter mode.

The coding of each of the slices may include coding each of the corresponding slices such that slice size information, prediction mode information, and coding order information for each of the corresponding slices are included in a slice header.

According to another aspect of the present invention, there is provided an image compression apparatus including a slice processing unit and an encoding unit. The slice processing unit divides each of a plurality of pictures into predetermined slices and determines a prediction mode having higher efficiency and a coding order for each of corresponding slices of the pictures by performing prediction on the corresponding slices. The encoding unit codes each of the slices in the determined prediction mode according to the determined order of coding, wherein the plurality of pictures is coded through cross-reference between them.

According to still another aspect of the present invention, there is provided an image decompression method. The image decompression method includes parsing a slice header included in a bitstream to extract slice size information, prediction mode information, and coding order information for a slice and decoding the slice based on the extracted slice size information, prediction mode information, and coding order information. The bitstream is coded by cross-referring between a plurality of pictures, each of the plurality of pictures is divided into predetermined slices, and a prediction mode having higher efficiency and a coding order are determined for each of corresponding slices of the pictures based on the result of prediction on the corresponding slices.

According to yet another aspect of the present invention, there is provided an image decompression apparatus including a slice parser and a decoding unit. The slice parser parses a slice header included in a bitstream to extract slice size information, prediction mode information, and coding order information for a slice. The decoding unit decodes the slice based on the extracted slice size information, prediction mode information, and coding order information. The bitstream is coded by cross-referring between a plurality of pictures, each of the plurality of pictures is divided into predetermined slices, and a prediction mode having higher efficiency and a coding order are determined for each of corresponding slices of the pictures based on the result of prediction on the corresponding slices.

BRIEF DESCRIPTION OF THE DRAWINGS

The above aspects and other aspects of the present invention will become more apparent by describing in detail exemplary embodiments thereof with reference to the attached drawings in which.

DETAILED DESCRIPTION OF EXEMPLARY EMBODIMENTS OF THE PRESENT INVENTION

Unlike a conventional image compression method in which one entire picture is intracoded, a plurality of pictures is coded through cross-reference between them in an image compression method according to exemplary embodiments of the present invention. In other words, among the plurality of pictures, only a portion to be used as a reference image is intracoded and the other portion is intercoded. Instead of using a picture as the basic unit of coding like in the conventional image compression method, a plurality of pictures is constructed simultaneously while being used for prediction coding through cross-reference between them. In this way, by coding the plurality of pictures at one time, coding efficiency can be improved.

Figure 1A:
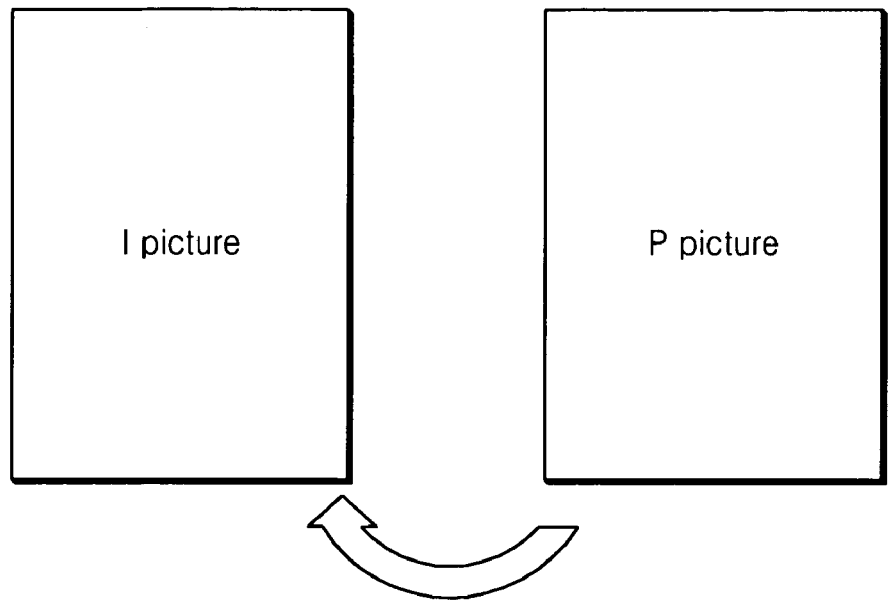
FIGS. 1A and 1B are reference diagrams for explaining a conventional image compression method.
Figure 1B:
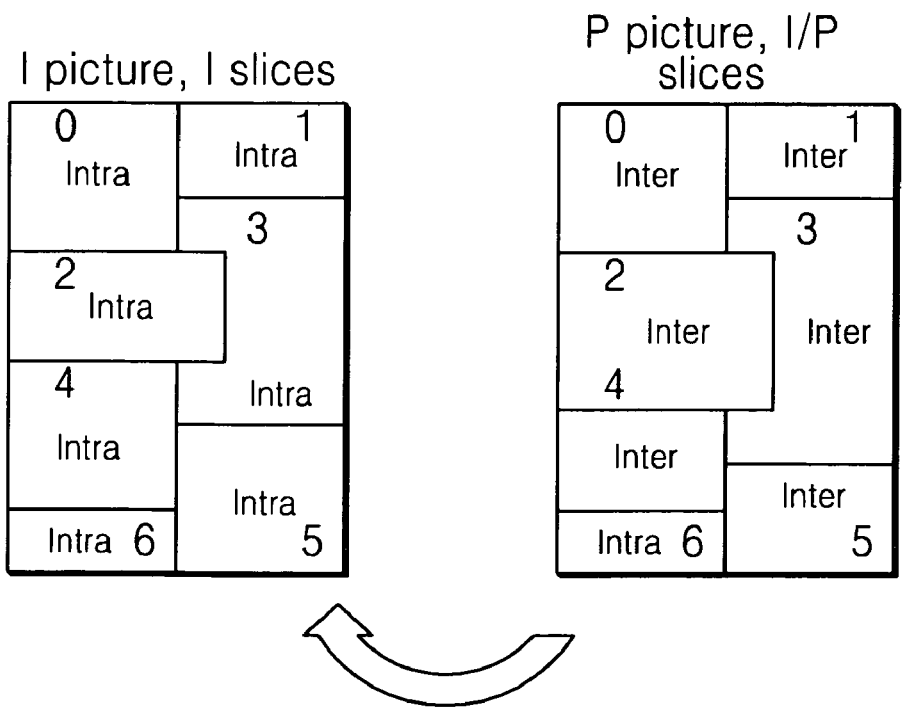
Figure 2:
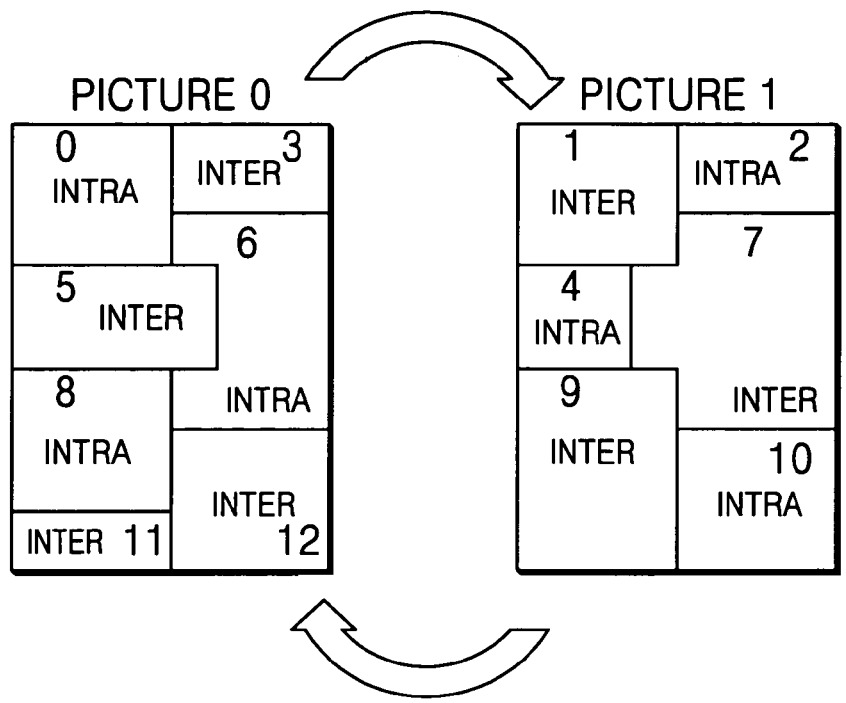
FIG. 2 is a reference diagram for explaining an image compression method according to an exemplary embodiment of the present invention.

FIG. 2 is a reference diagram for explaining an image compression method according to an exemplary embodiment of the present invention. Description is made of a case where two pictures are coded simultaneously for convenience of explanation, but the same principle may also be applied to a case where at least three pictures are coded simultaneously.

Referring to FIG. 2, in an image compression method according to an exemplary embodiment of the present invention, a picture is divided into slices having predetermined sizes, a prediction mode having higher efficiency, i.e., an intra mode or an inter mode, is determined for each slice, and a coding order is determined for each slice.

For example, prediction is performed on a first slice of a picture 0 and a corresponding first slice of a picture 1 in an intra mode and an inter mode. The results of the prediction are then compared and a mode having higher efficiency is determined as a prediction mode for each slice. In FIG. 2, an intra mode (0) is determined for the first slice of the picture 0 and an inter mode (1) is determined for the first slice of the picture 1. The order of coding is such that an intra mode precedes an inter mode. The order of coding is indicated by numbers in FIG. 2.

For second slices of the picture 0 and the picture 1, prediction is performed in the above-described manner and the results of the prediction are then compared. Thus, an intra mode (2) is determined for the second slice of the picture 1 and an inter mode (3) is determined for the second slice of the picture 0. The order of coding is also determined based on the foregoing principle. For the remaining slices of the picture 0 and the picture 1, the same procedures are performed.

Thus, unlike a conventional image compression method in which a picture as an I picture is used as a reference image for itself, a prediction mode is determined for each slice of each of a plurality of pictures and the plurality of pictures is coded through cross-reference between them. In other words, a slice size, a prediction mode, and a coding order can be determined for each slice differently according to the characteristic of a picture. In addition, image coding efficiency can be improved by expanding an interceding region having higher compression efficiency than an intracoding region.

At this time, a slice size may vary from a macroblock to a picture according to the characteristic of a picture. In other words, one of the picture 0 and the picture 1 may be determined as an I picture or a P picture. Alternatively, an intra mode or an inter mode may be determined for each macroblock. In any of the two cases, if an intra mode is determined for a first slice, any of an intra mode and an inter mode may be determined for the remaining slices.

Figure 3:
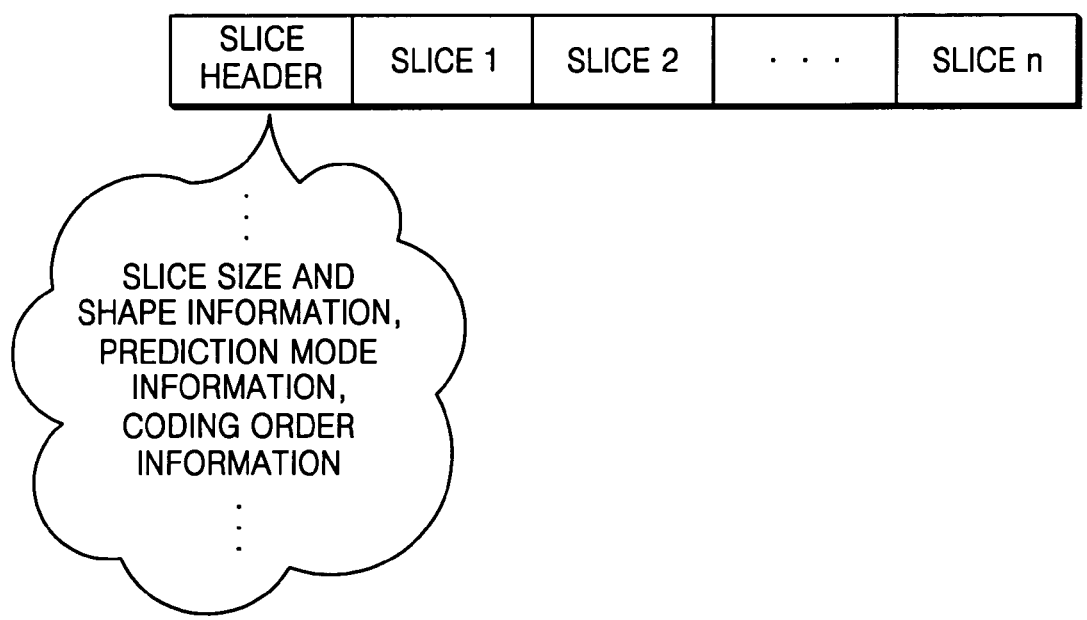
FIG. 3 illustrates an example of a bitstream compressed using an image compression method according to an exemplary embodiment of the present invention.

FIG. 3 illustrates an example of a bitstream compressed using an image compression method according to an exemplary embodiment of the present invention.

Referring to FIG. 3, a slice header is added to a front portion of a bitstream and the bitstream includes a plurality of slices 1 through n. In particular, as shown in FIG. 3, the slice header includes slice size information, prediction mode information, and coding order information that are determined for each of the slices 1 through n. In addition, each of the slices 1 through n includes the result of coding through cross-reference between a plurality of pictures based on the slice size information, the prediction mode information, and the coding order information included in its slice header.

Thus, an image decompression apparatus for decoding a bitstream according to exemplary embodiments of the present invention decodes each slice based on slice size information, prediction mode information, and coding order information included in the slice header.

Figure 4:
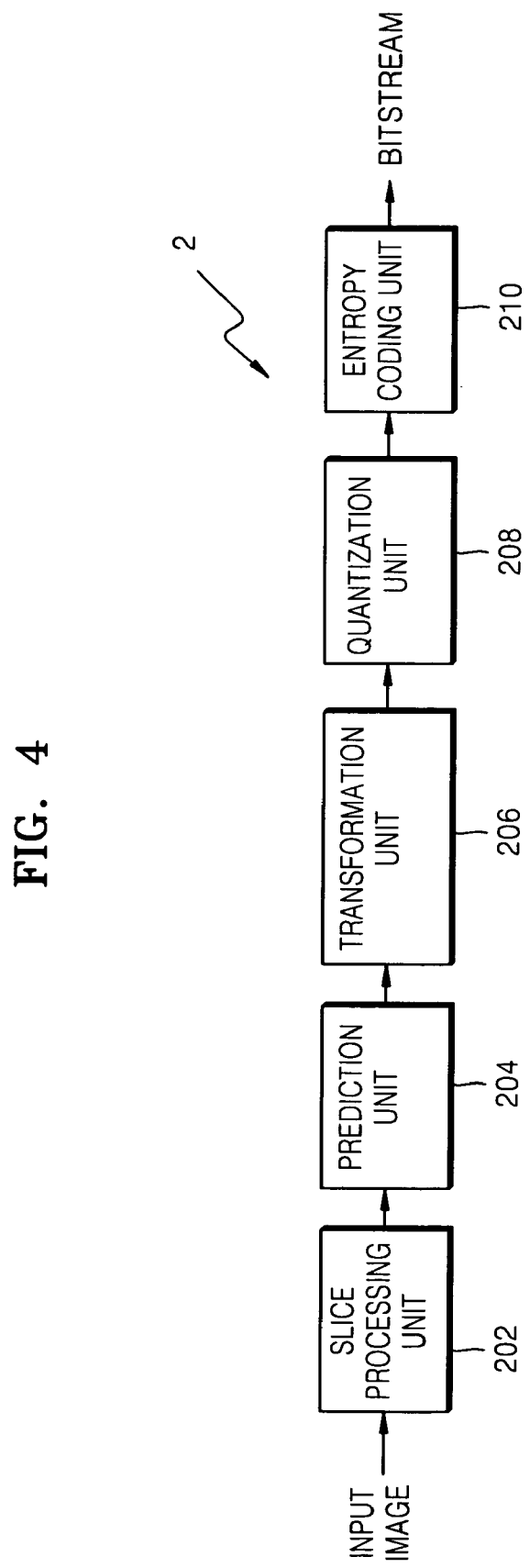
FIG. 4 is a block diagram of an image compression apparatus according to an exemplary embodiment of the present invention.

FIG. 4 is a block diagram of an image compression apparatus according to an exemplary embodiment of the present invention.

Referring to FIG. 4, an image compression apparatus 2 codes an input image, outputs a bitstream, and includes a slice processing unit 202, a prediction unit 204, a transformation unit 206, a quantization unit 208, and an entropy coding unit 210.

The slice processing unit 202 divides each of a plurality of pictures into predetermined slices and performs prediction on each of the divided slices in various modes, thereby determining a slice size having higher compression efficiency, a prediction mode having higher efficiency, and a coding order for each of the slices. As shown in FIG. 3, the determined slice size information, the determined prediction mode information, and the determined coding order information are included in the slice header to be referred to in decoding. Each of the slices is coded through cross-reference between the plurality of pictures based on the determined slice size information, prediction mode information, and coding order information.

In addition, various compression techniques are used to improve data compression efficiency and a method conventionally used in a CODEC is used. In other words, the prediction unit 204 performs prediction on a slice in an intra mode or an inter mode, i.e., a prediction mode determined for the slice. The transformation unit 206 decomposes an image into frequency bands and transforms low-frequency components into high-frequency components, thereby removing spatial redundancy of the image. Discrete cosine transform (DCT) is representative transformation. The quantization unit 208 performs linear quantization on direct current (DC) components in a frame and quantization having a dead zone where an output value is 0 regardless of an input value for the other coefficients. The entropy coding unit 210 codes quantized data using Huffman coding or arithmetic coding.

Figure 5:
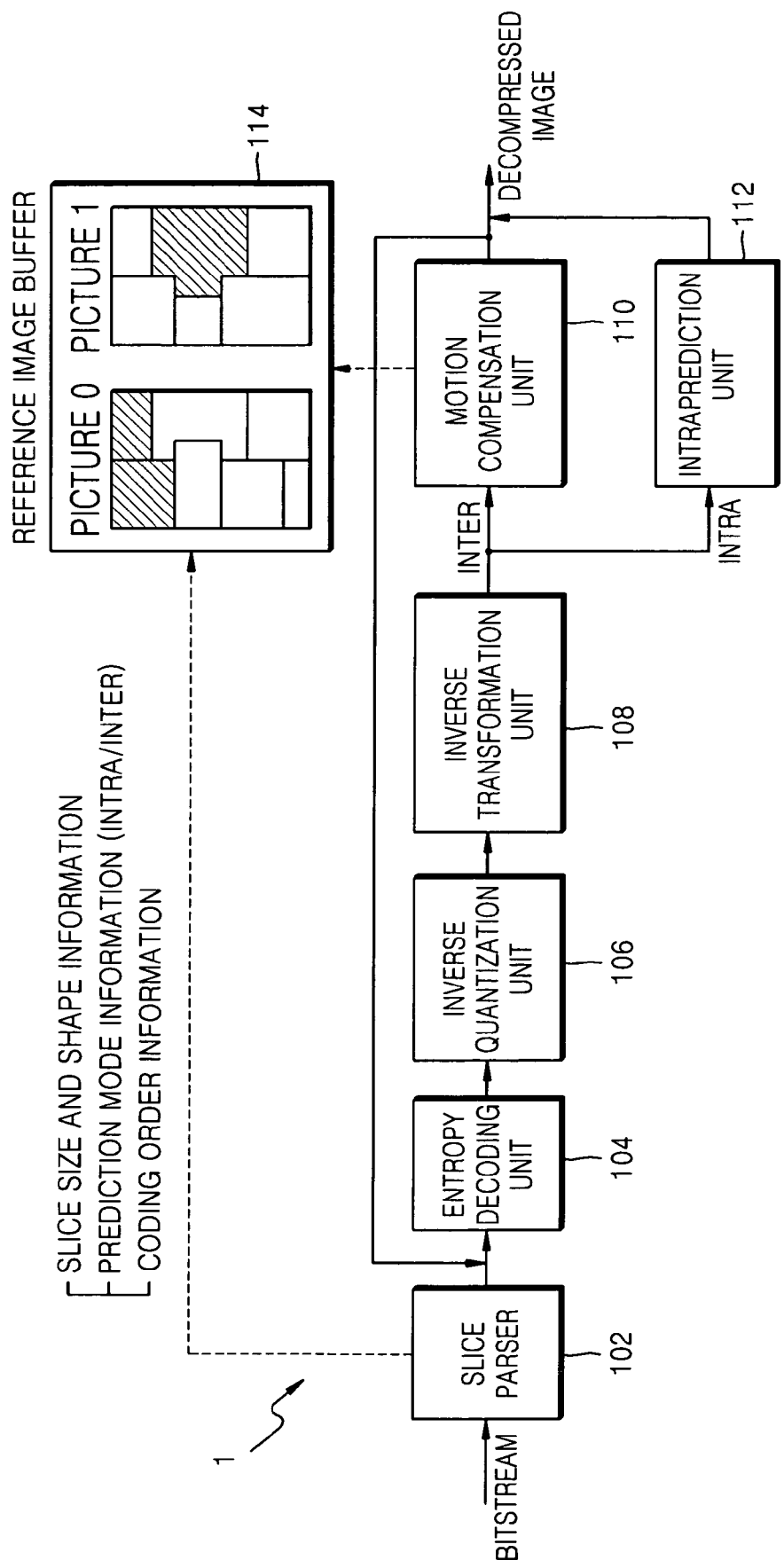
FIG. 5 is a block diagram of an image decompression apparatus according to an exemplary embodiment of the present invention.

FIG. 5 is a block diagram of an image decompression apparatus according to an exemplary embodiment of the present invention.

Referring to FIG. 5, an image decompression apparatus 1 decodes an input bitstream, outputs a decompressed image, and includes a slice parser 102, an entropy decoding unit 104, an inverse quantization unit 106, an inverse transformation unit 108, a motion compensation unit 110, and an intraprediction unit 112.

The slice parser 102 parses a slice header to extract slice size and shape information, prediction mode information, and coding order information. Each slice divided based on the extracted slice size information is decoded based on the extracted prediction mode information and coding order information.

Compressed data is decoded according to various compression techniques and a method conventionally used in a CODEC is used. The motion compensation unit 110 decompresses an image by referring to a currently constructed image stored in a reference image buffer 114. At this time, the motion compensation unit 110 decodes each slice based on the slice size and shape information, the prediction mode information, and the coding order information extracted by the slice parser 102. In other words, a decompressed image is constructed in a picture including decoded slices and a slice corresponding to an inter mode is decompressed by referring to the previously decoded slices.

Hereinafter, the image compression method and the image decompression method according to exemplary embodiments of the present invention will be described based on the configurations of the image compression apparatus 2 and the image decompression apparatus 1.

The image compression method according to exemplary embodiments of the present invention includes dividing each of a plurality of pictures into predetermined slices, performing prediction on corresponding slices of the pictures to determine a prediction mode having higher efficiency and a coding order for each of the slices, and coding each of the slices in the determined prediction mode according to the determined coding order. At this time, the plurality of pictures is coded through cross-reference between them, so that each slice corresponds to a prediction mode having higher efficiency.

Figure 6:
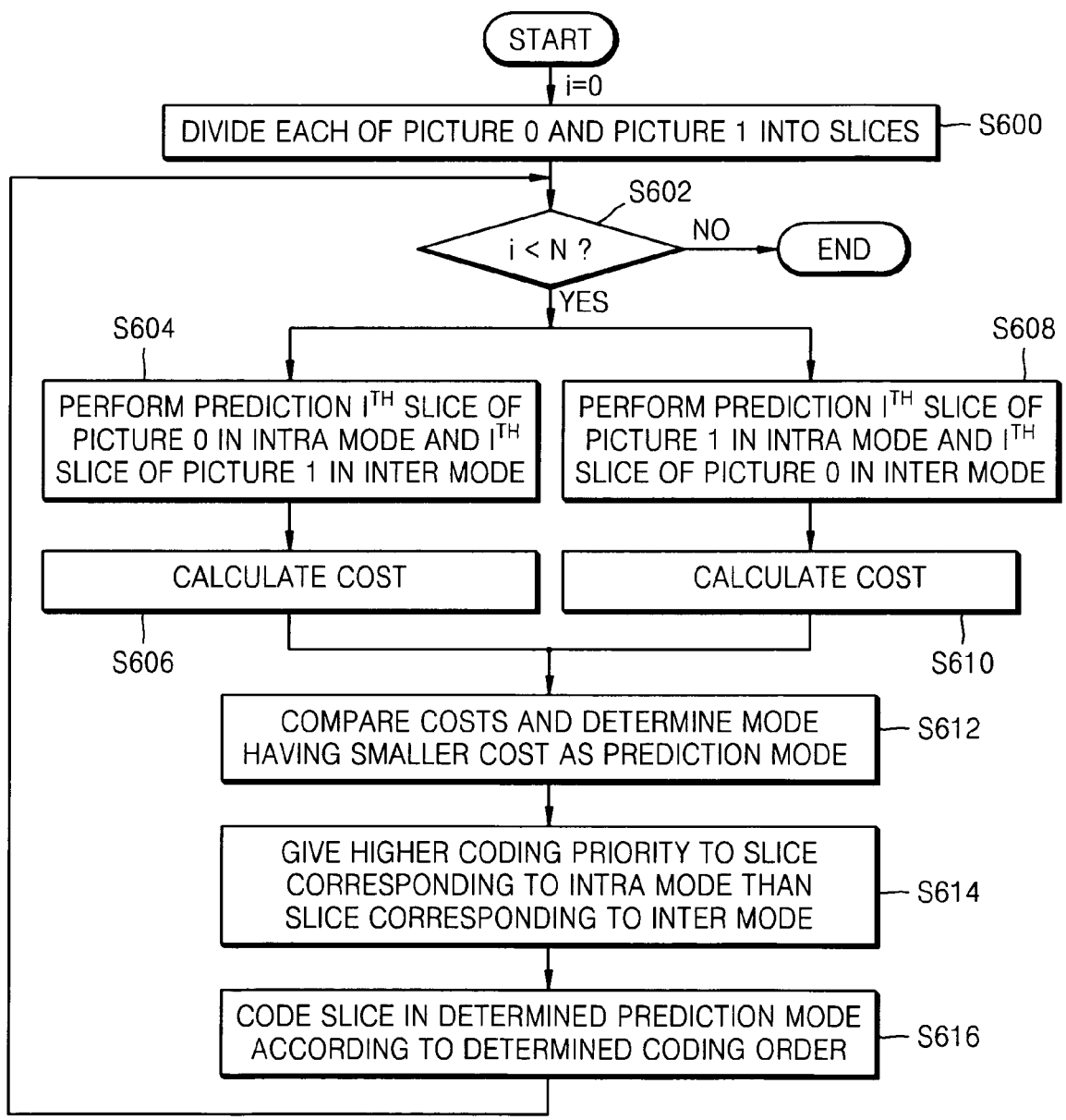
FIG. 6 is a flowchart illustrating an image compression method according to an exemplary embodiment of the present invention.

FIG. 6 is a flowchart illustrating an image compression method according to an exemplary embodiment of the present invention.

Description is made of a case where two pictures are coded through cross-reference between the two pictures for convenience of explanation, but the same principle may also be applied to a case where at least three pictures are coded through cross-reference between them.

Referring to FIG. 6, each of a picture 0 and a picture 1 is divided into predetermined slices in operation S600. For each slice in operation S602, an intra mode is determined for an $i^{th}$ slice of the picture 0, an inter mode is determined for an $i^{th}$ slice of the picture 1, and prediction is performed on the $i^{th}$ slices, in operation S604. A cost is calculated for the prediction in operation S606. Similarly, an intra mode is determined for the $i^{th}$ slice of the picture 1, an inter mode is determined for the $i^{th}$ slice of the picture 0, and prediction is performed on the $i^{th}$ slices, in operation S608. A cost is calculated for the prediction in operation S610. The costs for the predictions are compared and a mode having the smaller cost is determined as a prediction mode for each of the $i^{th}$ slices in operation S612. For example, referring to FIG. 2, an intra mode is determined for the first slice of the picture 0 and an inter mode is determined for the first slice of the picture 1.

A slice corresponding to an intra mode is given the higher coding priority than a slice corresponding to an inter mode in operation S614. In other words, since an image corresponding to the intra mode is referred to by an image corresponding to the inter mode, the image corresponding to the intra mode is coded prior to that corresponding to the inter mode. Thus, each slice is coded in the determined prediction mode according to the determined coding order in operation S616. At this time, each slice is coded so that slice size information, prediction mode information, and coding order information for each slice are included in a slice header. Operations S604 through S616 are performed on all slices of a picture.

Figure 7A:
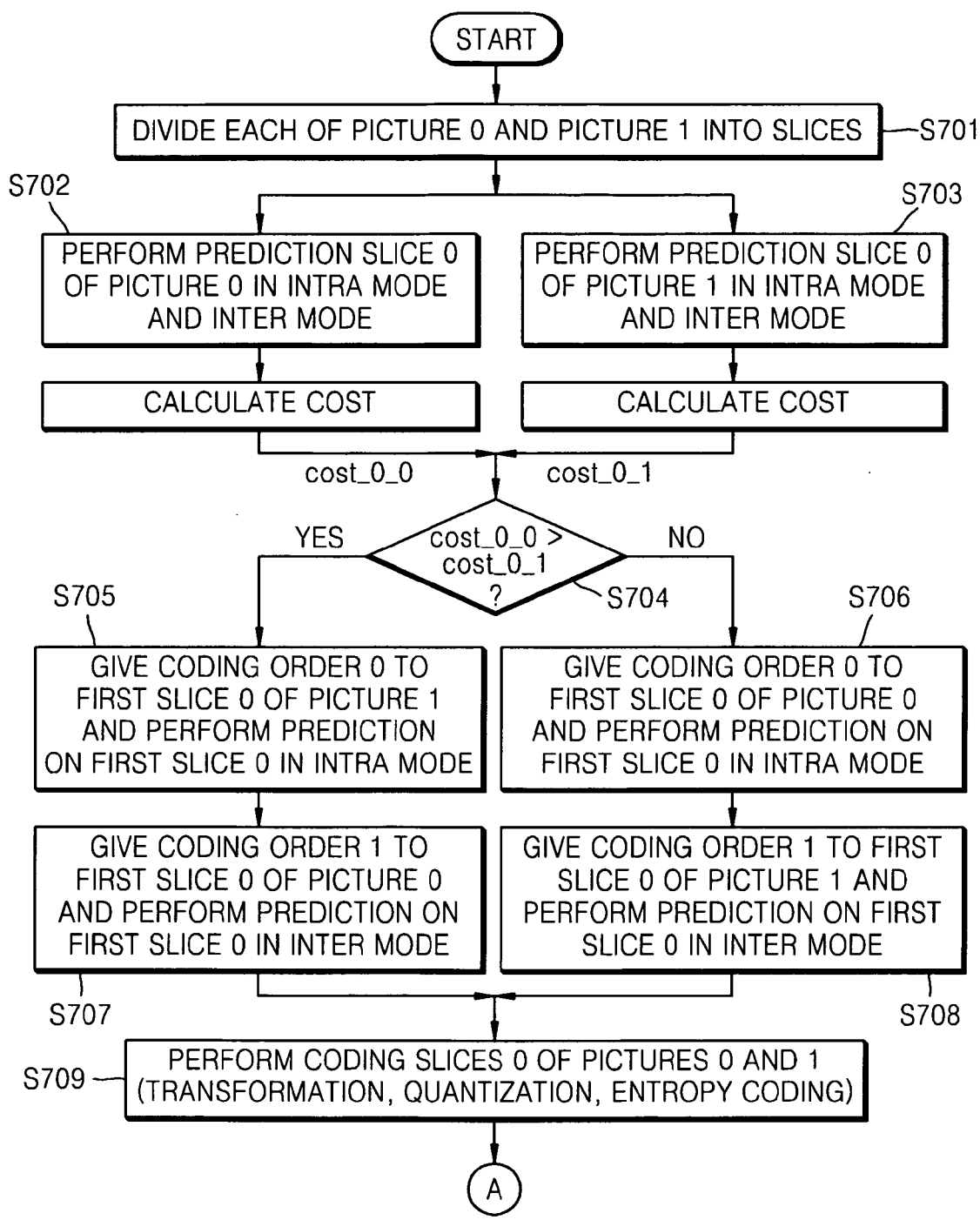
FIGS. 7A and 7B are detailed flowcharts illustrating an image compression method according to an exemplary embodiment of the present invention.
Figure 7B:
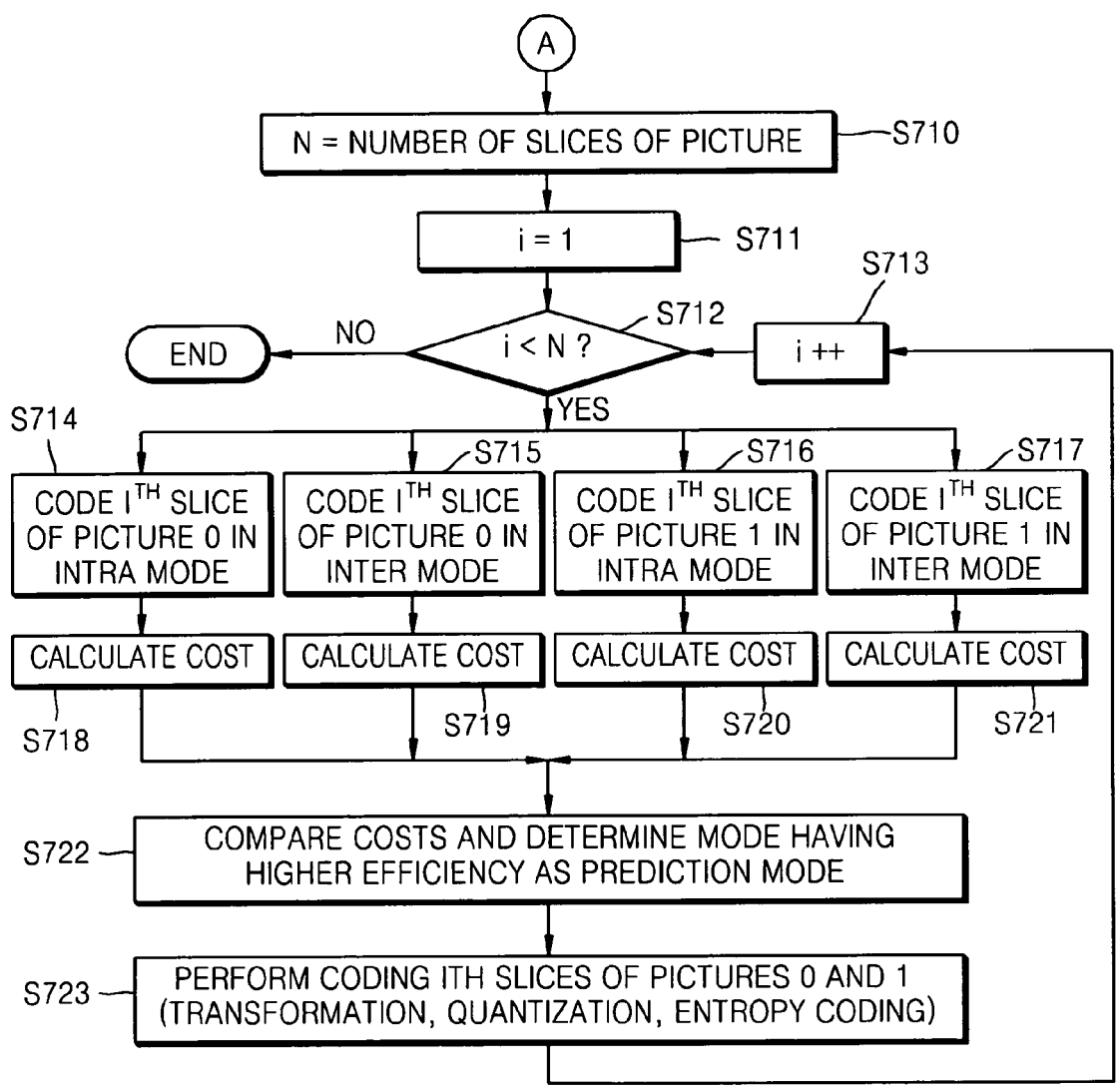

FIGS. 7A and 7B are detailed flowcharts illustrating an image compression method according to an exemplary embodiment of the present invention. Although FIGS. 7A and 7B are separated due to space constraints, they illustrate a continuous procedure for explaining in detail the image compression method shown in FIG. 6.

FIG. 7A is a flowchart illustrating a process of determining a prediction mode and a coding order for a first slice, and FIG. 7B is a flowchart illustrating a process of determining prediction modes and the coding orders for the remaining slices following the first slice.

Referring to FIG. 7A, each of the picture 0 and the picture 1 is divided into a plurality of slices in operation S701. Prediction is performed on the first slices 0 of the picture 0 in operation S702 and the picture 1 in operation S703 in an intra mode and an inter mode. Costs are calculated for the predictions and are then compared in operation S704. A coding order 0 is assigned to the first slice of the picture having the smaller cost in operations S705 and S706, and the slice is predicted in an intra mode. A coding number 1 is assigned to the first slice of the picture having the larger cost in operations S707 and S708, and the slice is predicted in an inter mode. The first slices of the pictures are coded in the determined prediction modes according to the assigned coding orders in operation S709.

Referring to FIG. 7B, in operations S710 to S721, prediction is performed on the remaining slices included in the picture 0 and the picture 1 in the same manner, a prediction mode having higher efficiency and a coding order are determined for each of the slices in operation S722, and each of the slices is coded in a prediction mode according to a coding order determined for each of the slices in operation S723.

Figure 8:
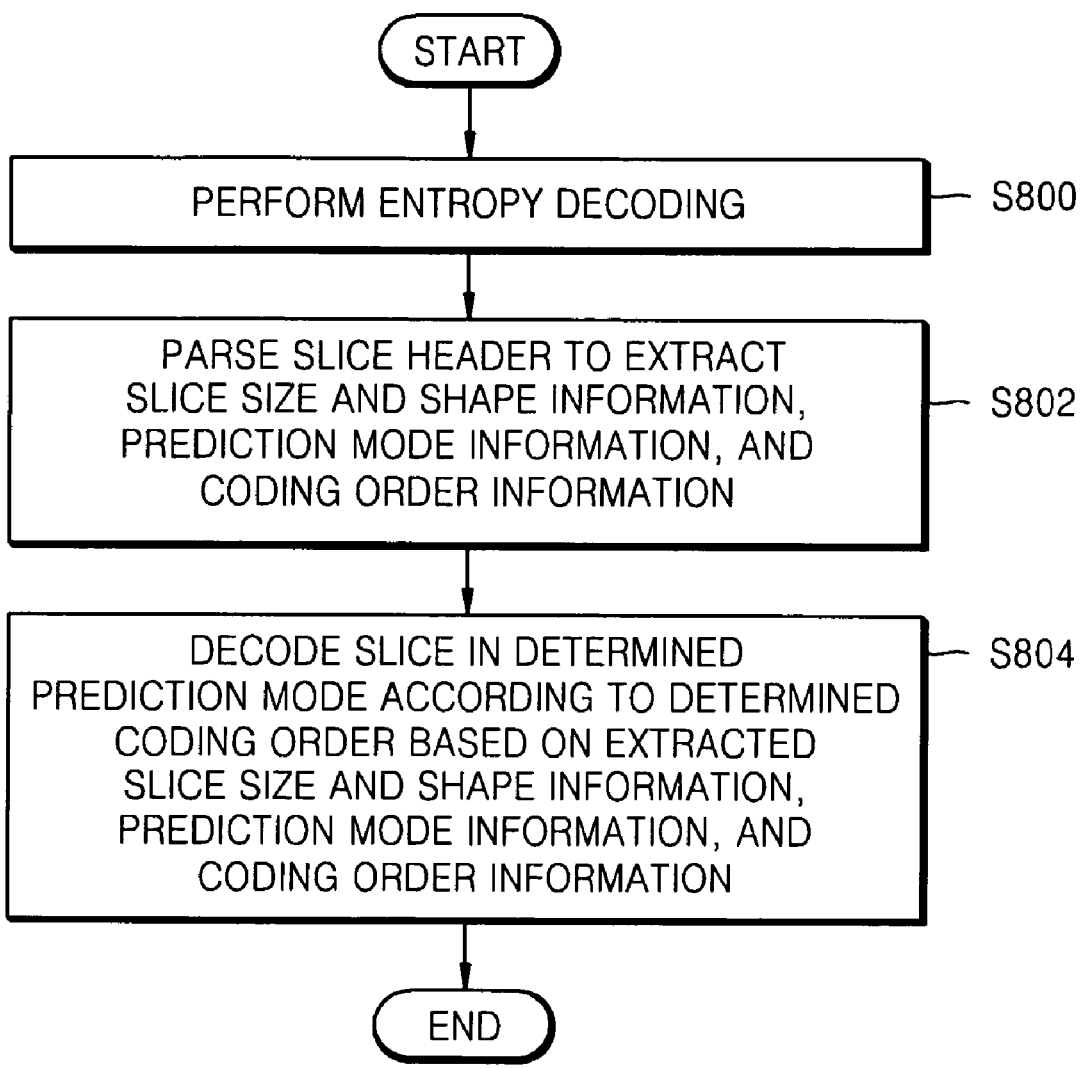
FIG. 8 is a flowchart illustrating an image decompression method according to an exemplary embodiment of the present invention.

FIG. 8 is a flowchart illustrating an image decompression method according to an exemplary embodiment of the present invention.

Referring to FIG. 8, the image decompression method includes entropy-decoding an input bitstream (operation S800), parsing a slice header included in the input bitstream to extract slice size information, prediction mode information, and coding order information (operation S802), and decoding each slice in a prediction mode according to a coding order based on the extracted slice size information, prediction mode information, and coding order information (operation S804). At this time, the input bitstream is coded through cross-reference between a plurality of pictures, where, as shown in FIG. 6, each of the plurality of pictures is divided into predetermined slices and a prediction mode having higher efficiency and a coding order are determined for each of corresponding slices of the pictures based on the results of prediction on the slices of the pictures.

Figure 9:
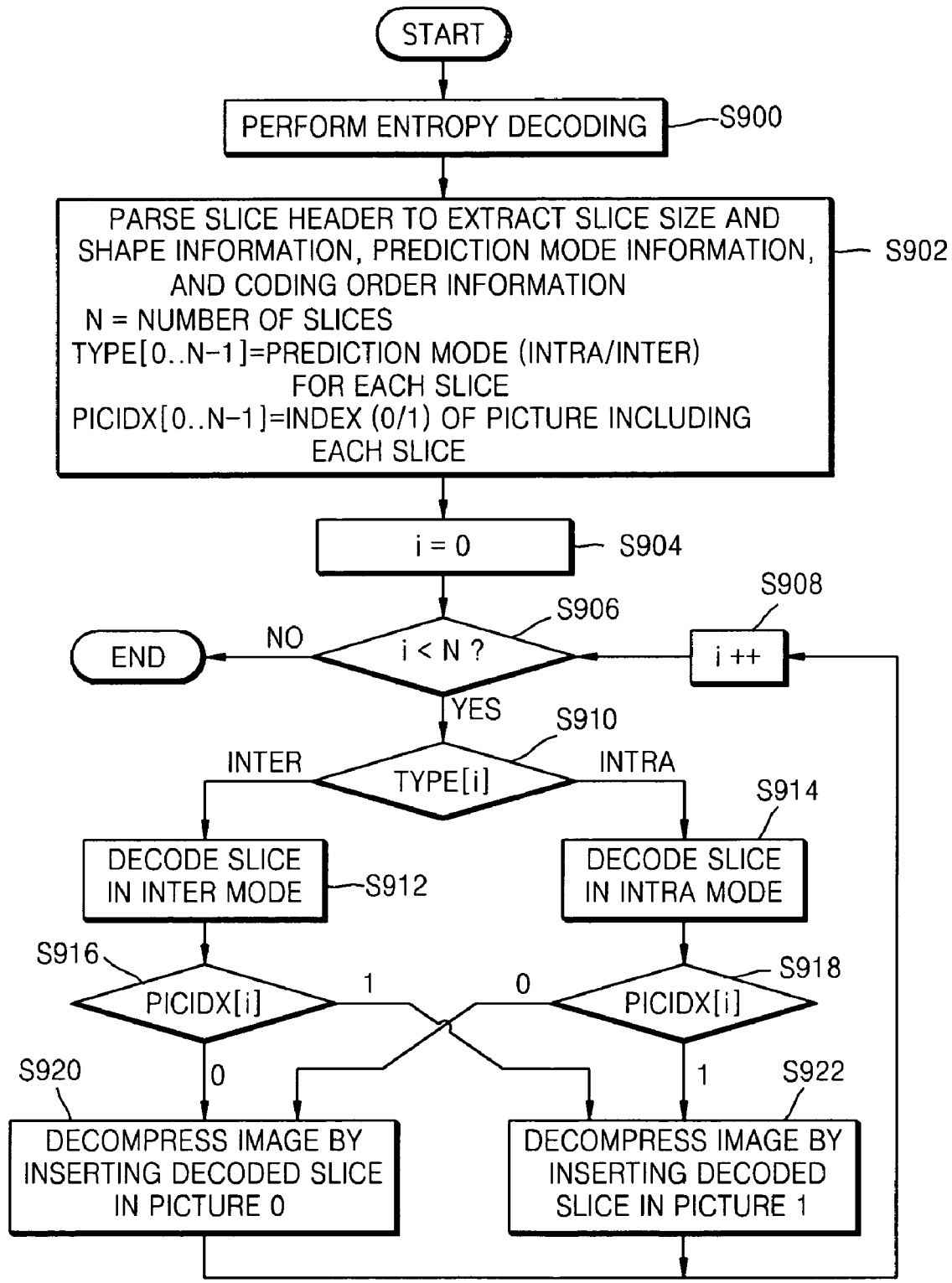
FIG. 9 is a detailed flowchart illustrating an image decompression method according to an exemplary embodiment of the present invention.

FIG. 9 is a detailed flowchart illustrating an image decompression method according to an exemplary embodiment of the present invention.

Referring to FIG. 9, a slice header of an entropy-decoded bitstream (from operation S900) is parsed to extract slice size information, prediction mode information, and coding order information for each slice in operation S902, and in operations S904 to S922, each slice divided based on the extracted slice size is decoded based on the extracted prediction mode information and the extracted coding order information. In other words, when a slice corresponds to an intra mode, prediction is performed in the intra mode in operation S914 and an image is decompressed by inserting a decoded slice in a corresponding picture in operations S918, S920 and S922. When a slice corresponds to an inter mode, prediction is performed in the inter mode in operation S912 and an image is decompressed by inserting a decoded slice in a corresponding picture in operations S916, S920 and S922. Thus, a slice can be decoded in a prediction mode used for the most efficient compression of the slice. In particular, when a slice corresponds to the inter mode, it is decoded by referring to an already decompressed portion of a currently decompressed picture. For example, if the picture 0 is currently decoded, an already decompressed portion of the picture 1 is used as a reference image.

As described above, through an image compression method and apparatus and an image decompression method and apparatus according to exemplary embodiments of the present invention, coding efficiency is improved by coding a plurality of pictures through cross-reference between the pictures.

A prediction mode and a coding order can be determined for each slice of each of a plurality of pictures and thus, an intercoding region having higher compression efficiency than an intracoding region can be expanded, thereby improving the efficiency of image compression/decompression.

Moreover, instead of using a picture as the basic unit of coding like in a conventional image compression method, a plurality of pictures is constructed simultaneously while being used for prediction coding through cross-reference between them. In this way, by coding the plurality of pictures at one time, coding efficiency can be improved.

The image compression method and the image decompression method according to exemplary embodiments of the present invention can also be embodied as computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, optical data storage devices, and carrier waves.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image compression method comprising:
   dividing, by a device for image compression, each of a plurality of pictures into predetermined slices;
   determining, by the device, a prediction mode having a higher efficiency for each of corresponding slices of the plurality of pictures by performing prediction on the corresponding slices, and determining a coding order for slices of the plurality of pictures based on the determined prediction mode for slices of the plurality of pictures; and
   coding each of the slices in the determined prediction mode according to the determined coding order;
   wherein the plurality of pictures are simultaneously coded by coding the slices of the plurality of pictures through a cross-reference between the slices of the plurality of pictures.

2. The image compression method of claim 1, wherein a size and shape of each of the predetermined slices vary from a macroblock to a picture.

3. The image compression method of claim 1, wherein the determination of the prediction mode and the coding order comprises:
   comparing a cost corresponding to prediction of each of the corresponding slices in an intra mode and a cost corresponding to prediction of each of the corresponding slices in an inter mode and determining a mode having a smaller cost as a prediction mode for each of the corresponding slices.

4. The image compression method of claim 3, wherein the determination of the prediction mode and the coding order further comprises:
   determining the coding order based on the determined prediction mode such that, among the corresponding slices of the plurality of pictures, a slice corresponding to an intra mode has a higher coding priority than a slice corresponding to an inter mode.

5. The image compression method of claim 1, wherein the coding of each of the slices comprises:
   coding each of the corresponding slices such that slice size and shape information, prediction mode information, and coding order information for each of the corresponding slices are included in a slice header.

6. An image compression apparatus comprising:
   a slice processing unit which divides each of a plurality of pictures into predetermined slices and determines a prediction mode having a higher efficiency for each of corresponding slices of the plurality of pictures by performing prediction on the corresponding slices, and determining a coding order for slices of the plurality of pictures based on the determined prediction mode for slices of the plurality of pictures; and
   an encoding unit which codes each of the slices in the determined prediction mode according to the determined coding order, wherein the plurality of pictures are simultaneously coded by coding the slices of the plurality of pictures through a cross-reference between the slices of the plurality of pictures.

7. The image compression apparatus of claim 6, wherein a size and shape of each of the predetermined slices vary from a macroblock to a picture.

8. The image compression apparatus of claim 6, wherein the slice processing unit compares a cost corresponding to prediction of each of the corresponding slices in an intra mode and a cost corresponding to prediction of each of the corresponding slices in an inter mode and determines a mode having a smaller cost as a prediction mode for each of the corresponding slices.

9. The image compression apparatus of claim 8, wherein the slice processing unit determines the coding order based on the determined prediction mode such that, among the corresponding slices of the plurality of pictures, a slice corresponding to an intra mode has a higher coding priority than a slice corresponding to an inter mode.

10. The image compression apparatus of claim 6, wherein the slice processing unit adds slice size and shape information, prediction mode information, and coding order information for each of the corresponding slices to a slice header.

11. An image decompression method comprising:
parsing, by a device for image decompression, a slice header included in a bitstream to extract prediction mode information, and coding order information for a slice; and
decoding, by the device, the slice based on the extracted slice size and shape information, prediction mode information, and coding order information,
wherein the bitstream is coded by cross-referring between a plurality of pictures, each of the plurality of pictures being divided into predetermined slices, and a prediction mode having a higher efficiency are determined for each of corresponding slices of the plurality of pictures by performing prediction on the corresponding slices, and a coding order is determined based on the determined prediction mode for slices of the plurality of pictures,
wherein the plurality of pictures are simultaneously decoded by decoding the slices of the plurality of pictures through a cross-reference between the slices of the plurality of pictures.

12. The image decompression method of claim 11, wherein the parsing a slice header comprises parsing a slice header in a bit stream to extract slice size and shape information, and a size and shape of each of the predetermined slices vary from a macroblock to a picture.

13. The image decompression method of claim 11, wherein the extracted prediction mode information is determined by comparing a cost corresponding to prediction of each of the corresponding slices in an intra mode and a cost corresponding to prediction of each of the corresponding slices in an inter mode and determining a mode having a smaller cost as a prediction mode for each of the corresponding slices.

14. The image decompression method of claim 13, wherein the extracted coding order information is determined such that, among the corresponding slices of the plurality of pictures, a slice corresponding to an intra mode has a higher coding priority than a slice corresponding to an inter mode.

15. An image decompression apparatus comprising:
a slice parser which parses a slice header included in a bitstream to extract, prediction mode information, and coding order information for a slice; and
a decoding unit which decodes the slice based on the extracted slice size and shape information, prediction mode information, and coding order information,
wherein the bitstream is coded by cross-referring between a plurality of pictures, each of the plurality of pictures being divided into predetermined slices, and a prediction mode having a higher efficiency is determined for each of corresponding slices of the plurality of pictures by performing prediction on the corresponding slices, and a coding order is determined based on the determined prediction mode for slices of the plurality of pictures,
wherein the plurality of pictures are simultaneously decoded by decoding the slices of the plurality of pictures through a cross-reference between the slices of the plurality of pictures.

16. The image decompression apparatus of claim 15, wherein the parsing a slice header comprises parsing a slice header in a bit stream to extract slice size and shape information, and a size and shape of each of the predetermined slices vary from a macroblock to a picture.

17. The image decompression apparatus of claim 15, wherein the extracted prediction mode information is determined by comparing a cost corresponding to prediction of each of the corresponding slices in an intra mode and a cost corresponding to prediction of each of the corresponding slices in an inter mode and determining a mode having a smaller cost as a prediction mode for each of the corresponding slices.

18. The image decompression apparatus of claim 17, wherein the extracted coding order information is determined such that, among the corresponding slices of the plurality of pictures, a slice corresponding to an intra mode has a higher coding priority than a slice corresponding to an inter mode.

* * * * *